United States Patent
Gee et al.

[11] 3,911,903
[45] Oct. 14, 1975

[54] OCULAR PNEUMOPLETHYSMOGRAPH AND METHOD OF OPERATION

[75] Inventors: William Gee, Smithtown, N.Y.;
Chester A. Smith, Jr., Burbank;
Clarence E. Hinsen, Chatsworth,
both of Calif.

[73] Assignee: Chester A. Smith, Jr., Burbank, Calif.

[22] Filed: Oct. 11, 1973

[21] Appl. No.: 405,511

[52] U.S. Cl. ........ 128/2.05 Q; 128/2 T; 128/2.05 E
[51] Int. Cl.² .......................................... A61B 5/02
[58] Field of Search .. 128/2 R, 2 T, 2.05 A, 2.05 E,
128/2.05 N, 2.05 Q, 2.05 R, 2.05 V; 73/80

[56] References Cited
UNITED STATES PATENTS

| | | | |
|---|---|---|---|
| 2,720,113 | 10/1955 | Statham | 128/2.05 E |
| 2,989,051 | 6/1961 | Zuidema et al. | 128/2.05 Q |
| 3,083,705 | 4/1963 | Johnson | 128/2.05 V |
| 3,308,810 | 3/1967 | Galin | 128/2 T |
| 3,542,011 | 11/1970 | Langenbeck | 128/2.05 E |

*Primary Examiner*—William E. Kamm
*Attorney, Agent, or Firm*—Julian J. Schamus

[57] ABSTRACT

A pneumatic device for determining blood pressure pulse waves at constantly changing levels of external vacuum as an indication of blood flow to a particular part of a human body including means (such as an eye cup) attachable to a body portion (such as the ocular globe) to deform the body portion in response to changing sub-atmospheric pressure (vacuum) external to the body portion; means (such as a vacuum system) for subjecting the body portion to external sub-atmospheric pressure; means for detecting pressure changes in the external sub-atmospheric pressure in response to pulsatile changes in the volume or pressure of the body portion; means for continuously varying the external sub-atmospheric pressure over a predetermined pressure range and a predetermined time span and means for continuously recording the pressure changes caused by the volume changes without regard to changes in the external sub-atmospheric pressure while simultaneously recording the change in the external sub-atmospheric pressure; which device may contain two simultaneously operating systems for recording blood pressure pulse waves from two particular body portions, and which is particularly applicable to the diagnosis of stenosis or occlusion in an internal carotid artery and for determining the extent of collateral circulation between the two internal carotid arteries.

8 Claims, 4 Drawing Figures

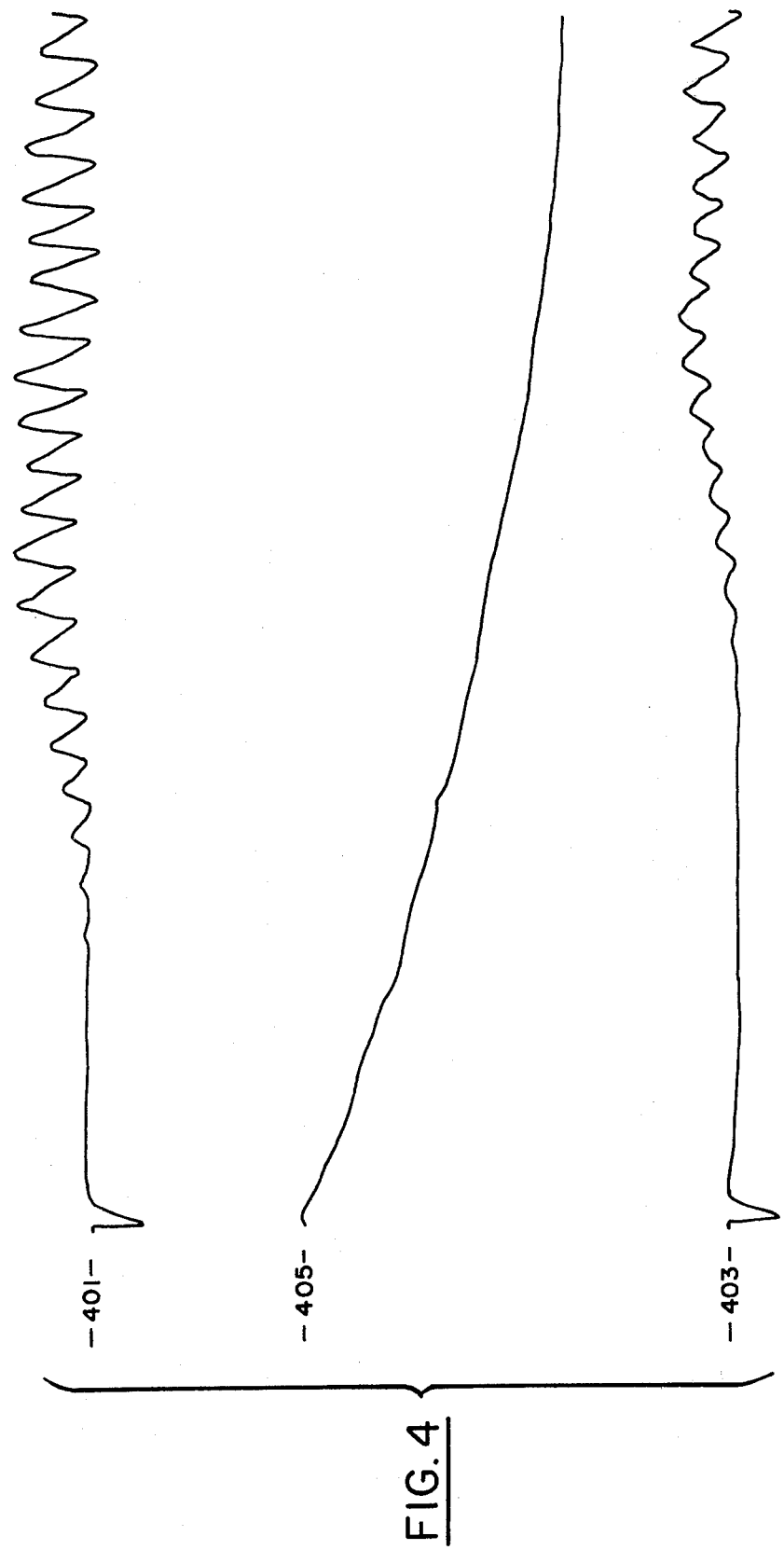

OCULAR PNEUMOPLETHYSMOGRAPH AND METHOD OF OPERATION

BACKGROUND OF THE INVENTION AND PRIOR ART

This invention relates to a medical diagnostic apparatus and method and more particularly to a device and method for the determination and recording of blood pressure pulse waves at constantly changing levels of externally applied vacuum or sub-atmospheric pressure to a particulr part or portion of the human body; and it is particularly applicable to the diagnosis of possible stenosis or occlusion in the internal carotid arteries of the human being.

It has long been recognized that stenosis or occulsion of the internal carotid artery is a cause of insufficient blood flow to the brain. When the degree of stenosis becomes acute and there is insufficient collateral circulation between the two internal carotid arteries, impairment of brain function or stroke is the inevitable result. The surgical treatment of extracranial cerebrovascular disease is a drastic and dangerous procedure; however, there is no safe, reliable method known to diagnose the exact extent or location of the stenosis in the internal carotid artery without resorting to either exploratory surgery or painful or potentially dangerous methods of diagnosis such as arteriography.

It should be pointed out that when a person has a "stroke", it is not immediately apparent to a physician who examines him whether the symtoms have been brought about by a cerebral hemorrage or internal bleeding in the brain or a vascular occlusion or stenosis and most prior differential diagnostic criteria enabling a distinction to be made between the two causes of stroke are not completely reliable, can only be determined over a period of time, and do not necessarily indicate whether the stroke is due to stenosis or occlusion of one of the internal carotid arteries or is due to a cerebral hemorrage. In addition, known methods of diagnosis do not indicate in advance of surgery the extent of collateral circulation between the two internal carotid arteries.

It has been proposed in the medical literature to obtain information on the blood pressure pulse waves in the internal carotid artery by the use of a vacuum system terminating in a suction cup applied to the ocular globe wherein the suction or vacuum is created by a saline hydraulic system. It has also been proposed to obtain information on brain blood flow by the application of pressure against the entire ocular orbit.

The concept of ocular plethysmography has been disclosed in an article by E. C. Brockenbrough, et al., "Review of Surgery" July – August, 1967, at pages 299 – 302, which is addressed to the measurement of an uncalibrated relative volume change in an ocular globe at a constant vacuum as an indication of blood flow in the opthalmic artery. The technique and equipment employed by the author is able to give only limited information as to impairment in the blood flow of one of the internal carotid arteries when compared to the other. In the device, the measurement is taken by attaching a small suction cup to the sclera of each eye. The device employed by the author consists of a hydraulic (saline) system in which differences in the volume of the ocular globe are translated into small changes in the pressure of the saline medium and measured by a transducer with respect to each eye. This technique does not indicate a unilateral blockage of a carotid artery in a patient who has developed collateral circulation which is effective at the particular reduced pressure employed in the measurement.

Kartchner, et al., in an article appearing in the "Archives of Surgery", Vol. 106, April 1973, at pages 528–535 discloses fundamentally the same equipment as employed by Brockenbrough, et al., and appear to have used higher recording speeds and a complicated listening device as means for diagnosis of stenosis in the internal carotid arteries. However, even though very interesting information is obtained by the Kartchner, et al., technique, it is not possible to use the results to determine immediately whether a patient is suffering from functionally significant stenosis without resorting to more drastic or invasive diagnostic techniques.

Professor H. Hager in an article appearing at pages 259 – 267 of "Triangle", Vol. 6, 1963–1964 (A Sandoz Pharmaceutical publication) has disclosed a device and method for measuring pulse waves of cranial ciirculation by applying pressure against the entire ocular orbit, including the ocular globe and the bony structure around the forehead, cheekbone and nose. The device uses pressures above atmospheric pressure and the pressures employed are high enough to cause extreme pain in the patient being examined. Although some significant information may be obtained by the Hager method, it is known that pressure applied against the ocular globe will frequently cause a lowering of the pulse rate as well as lowering of the blood pressure and in certain instances may cause cardiac standstill. There is thus not only pain and danger associated with the Hager technique, but it may have the effect of altering the very phenomena sought to be measured in the diagnosis to such a significant extent that anamolous results may be obtained.

All of the prior art known to the inventors seems to indicate that investigators have been attempting to develop blood pressure pulse data at pressure levels where a strong pulse from the isolated interior carotid artery would be obtained and have failed to realize that the most significant data can be obtained by determining (at least in a qualitative fashion) the intraocular pressure required to completely stop blood flow in the opthalmic artery. With alternate common carotid compression, over a constantly changing pressure range (without measuring the contribution of the external carotid artery) even more significant data with respect to the nature and extent of a stenosis and the development of collateral circulation can be determined.

The present invention enables the physician to make a determination of the intra-arterial pressure at which each eye begins to pulse at a specifically determinable level of vacuum and also enables him to determine the amplitude of pulse volume in each eye as related to a volumetric change in the ocular globe. Thus when applied as a diagnostic tool to the ocular globe, it is possible to indirectly determine the adequacy of internal carotid artery flow as a reflection of the degree of stenosis or of occlusion in the respective carotid artery and to directly determine the adequacy of collateral circulation to the respective eye during compression of the common carotid artery of the same side. This in turn reflects the fate of the ipsilateral cerebral hemisphere if the carotid artery is occluded either from progression of stenosis or operative clamping thereof for arterial repair.

The device of the present invention may be applied as a diagnostic tool to other portions of the body for the indication of relative blood flow so long as that portion of the body under investigation may be isolated with respect to its local blood circulation. For applications other than carotid arterial blood flow, it is necessary to appropriately change the form and shape of the portion of the device which attaches to the body so as to enable isolation of the body area under investigation.

Various prior techniques of diagnosis of various physical phenomena have been employed by the attachment of a pressure or suction device to either the ocular globe or the ocular orbit. The technique known as tonometry determines the intraocular fluid pressure. The technique known as opthalmodynomometry enables the determination of the systolic and diastolic blood pressure within the central retinal artery. Opthalmodynamography (essentially the technique employed by Hager) enables the determination of the orbital pulse volume change and the simultaneous determination of the orbital blood pressure at which these pulse volume changes occur, but measures the contribution of both the internal and external carotid artery to each eye. The technique known as ocular plethysmography enables the determination of pulsatile volume changes of the ocular globe and thus, when the hereinafter invention is applied to measurement of pulsatile changes in the ocular globe, it may be referred to as ocular pneumo-plethysmography.

In the technique referred to above as opthalmodynamography reference to the ocular orbit is intended to include the bony socket in which resides the ocular globe or eye ball, the extraocular muscles, the periorbital tissues and the eyelids with its contained tissues.

It is therefore an object of this invention to provide a medical diagnostic method and apparatus for the determination of pulsatile volume changes in a portion of the human body indirectly indicating the extent and nature of blood flow.

Another object of this invention is the provision of a diagnostic apparatus for the relative measurement of pulsatile blood flow in an internal carotid artery as indicated by volume changes in the ocular globe while a portion of the ocular globe is subjected to external vacuum or sub-atmospheric pressure resulting in the increase of intraocular pressure.

Still another object of this invention is the provision of an apparatus or device for comparing the blood flow through the two internal carotid arteries.

SUMMARY OF THE INVENTION

The above and other objects of this invention are in part accomplished by a device or apparatus for determining blood pressure pulse waves at constantly changing levels of external vacuum as an indication of blood flow to a particular part of a human body comprising vacuum transmitting means attachable to a body portion to deform the portion in response to changing sub-atmospheric pressure or vacuum in a system external to the body portion; transducer means for detecting pressure or volume changes in the system in response to changes in the volume or pressure of the body portion; vacuum control means for continuously varying the sub-atmospheric pressure in the external system over a predetermined pressure range; and recording means for continuously recording the pressure changes caused by the volume changes.

In a preferred embodiment of the invention, the pressure changes recorded are those pressure changes due to pulsatile changes in the body portion under investigation at a given (although constantly changing) external vacuum irrespective of the actual magnitude of such vacuum.

In a preferred embodiment of the invention, the pulsation signal transducing means is a differential pressure transducer. As used throughout this specification, the term differential refers to the term not in the sense in which it is employed in the calculus, but generally in the sense that the measurement taken is over a pressure difference between (for example) the chamber of a two chamber differential transducer. That is to say (when applied to changes in intraocular pressure) the pressure or volume change measurement taken is not taken against a reference pressure of atmospheric pressure or a fixed vacuum or sub-atmospheric pressure, but rather against the pressure in the pneumatic system employed in the device which was existent immediately preceding (in time reference) the pulsatile change under consideration.

In an embodiment of the invention for determining the relative blood flow in the two internal carotid arteries, the apparatus of this invention includes two parallel operating systems, which may operate simultaneously, for detecting and recording the volume changes in the eye cups attached to the two ocular globes while simultaneously recording gross changes in the pressure of the external sub-atmospheric pressure system. As used throughout this specification, reference to an external sub-atmospheric pressure or vacuum system refers to the pneumatic circuitry which is external to the body part under investigation but which represents a separate system.

In a particularly preferred embodiment of the invention, the signal transducing means comprises a differential transducer system comprising a pressure sensitive two chambered transducer having a moveable (inductance changing) diaphragm isolating the two chambers, an inductance coil in each of the chambers sensitive to the movement of the diaphragm, the inductance coils being electrically in series, a center tap for measuring voltage appearing between said coils in response to a known electrical excitation voltage imposed across the coil; and pneumomechanical means for imposing a varying pressure in one chamber of the transducer in a pneumatic circuit in which both sides of the transducer are exposed to the pressure change and simultaneously exposed to pressure changes of a larger magnitude such that the pressure change occurring on the one side of the transducer does not appreciably affect the pressure on the other side of the transducer.

DETAILED DESCRIPTION OF THE INVENTION AND DRAWINGS

Figure 1:
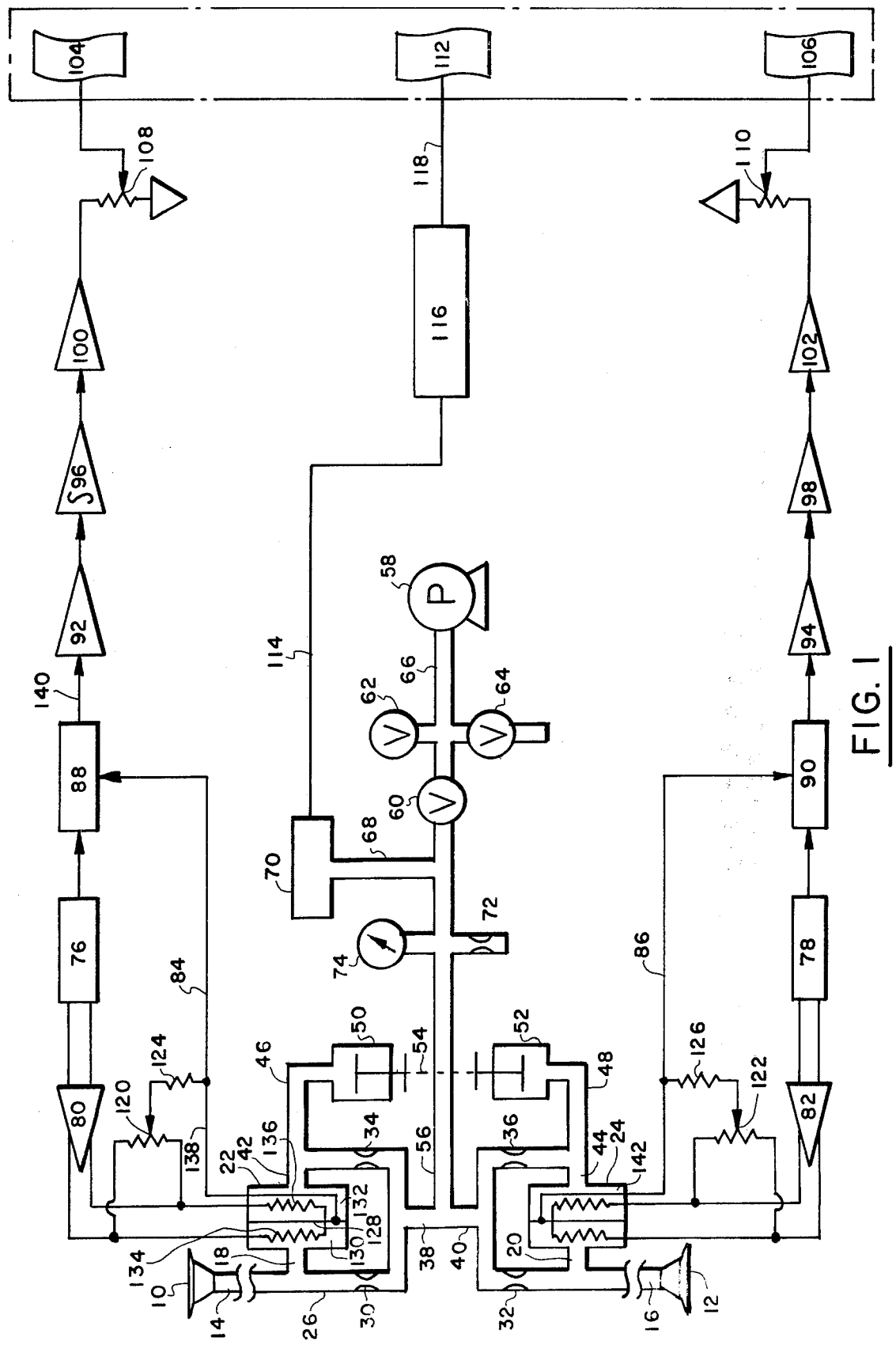
Figure 2:
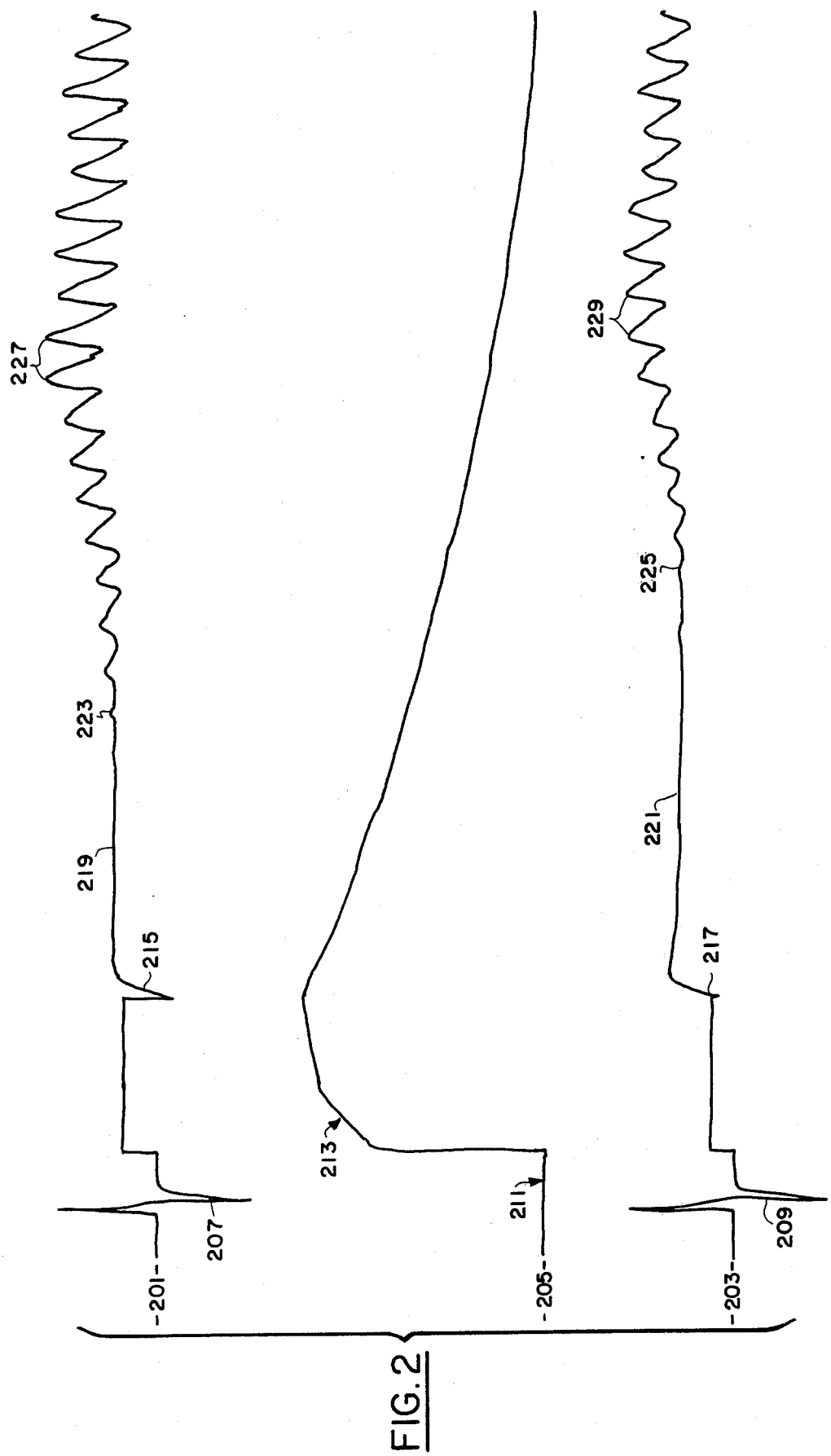
Figure 3:
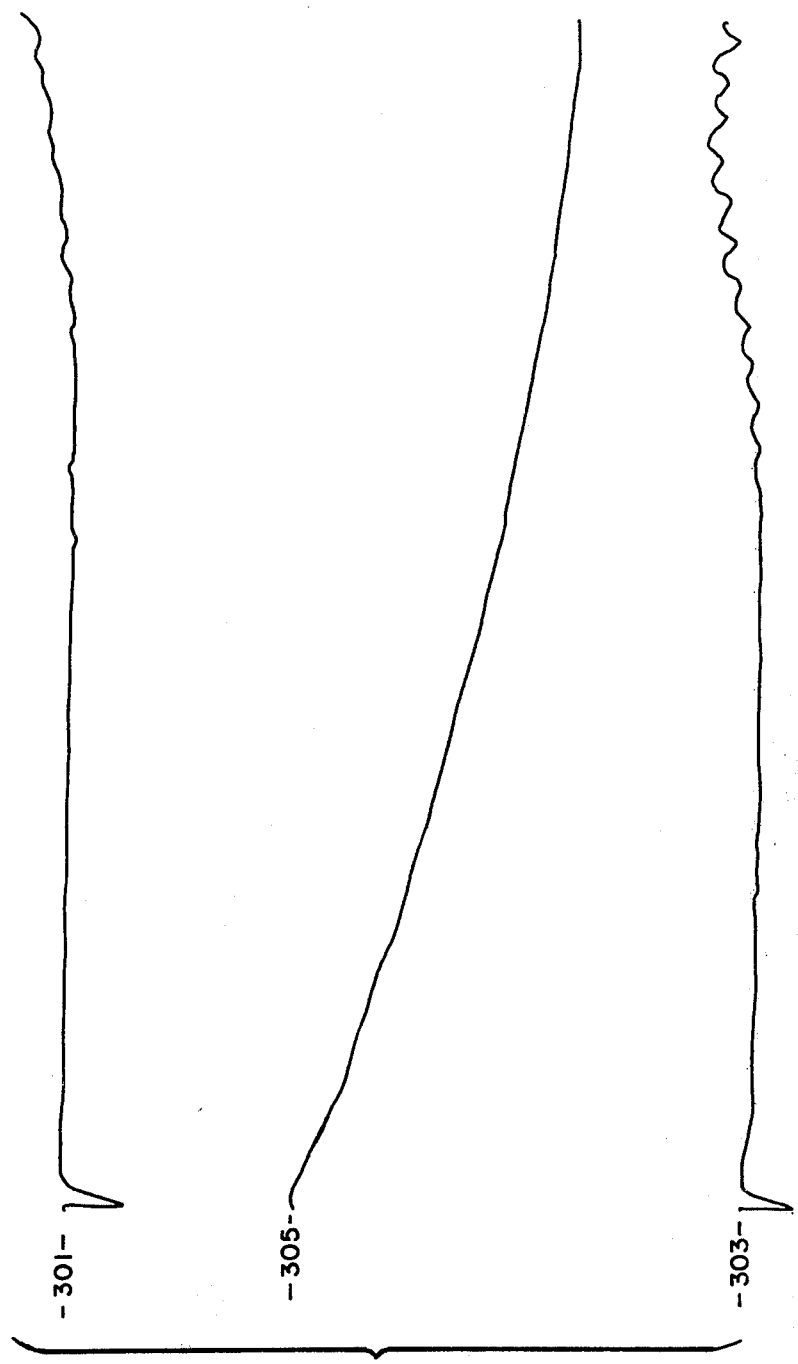

In the drawings accompanying this application FIG. 1 is a diagrammatic-schematic illustration of a preferred embodiment of the invention as applied to an ocular pheumoplethysmograph;

FIG. 2 is a generalized reproduction of the blood pressure information obtained in a typical diagnosis employing the device depicted in FIG. 1, employing a constantly decreasing vacuum in detection of pulsatile changes in both ocular gloves simultaneously without compression of either common carotid artery;

FIG. 3 is a generalized reproduction of blood pressure information obtained subsequent to the information obtained in FIG. 2 with compression of one common carotid artery indicating a stenosis of the uncompressed contrilateral common carotid artery; and FIG. 4 is a continuation of the data obtained in FIGS. 2 and 3 with compression of the other common carotid artery indicating blockage in the ipsilateral artery and the extent of collateral circulation.

Referring specifically to FIG. 1, which represents a schematic and diagramatic representation of one embodiment of an ocular pheumoplethysmograph of this invention, there are a pair of eye cups 10 and 12 for the right and left sclerae respectively. Each of the eye cups is attached to a suitable tubing material 14 and 16 and the tubing is in turn connected through the branches 18 and 20 respectively to a pair of differential pressure transducers 22 and 24. Around each of the transducers 22 and 24, there is a pneumatic circuit consisting of the extensions 26 and 28 of the tubings 14 and 16, pneumatic flow restrictors 30 and 32, 34 and 36, positioned with respect to each transducer 22 and 24 such that the vacuum inlets 38 and 40 are positioned between the respective pairs 30, 34 and 32, 36 of restrictors; pneumatic inlet means 42 and 44 to the transducers 22 and 24 on the functionally opposite sides thereof from the inlet means or branches 18 and 20. In addition, connected to the pneumatic inlet means 42 and 44 are pneumatic inlets 46 and 48 connected individually to a pair of calibrating syringes 50 and 52. As will be explained more fully hereinafter, the calibrating syringes 50 and 52 are ganged to a single plunger schematically shown at 54 so that they may operate simultaneously for calibration of the device.

The vacuum inlets 38 and 40 connected to a vacuum line 56 which leads ultimately to a vacuum pump 58. A check valve 60 is positioned between a vacuum control means consisting of a vacuum adjustment 62 and vacuum relief valve 64 approximately adjacent vacuum pump 58 on the extension 66 of the vacuum line 56 and the inlet line 68 to a vacuum measuring transducer 70. Along the vacuum line 56 between the vacuum inlets 38 and 40 and the vacuum transducer 70 inlet line 68, there is positioned an inlet restrictor 72 and a visual vacuum gauge 74.

Thus, the basic pneumatic circuitry of the device consists of the eye cups 10 and 12 through which suction may be applied to the sclera of each eye and the pneumatic system consisting fundamentally of the differential pressure transducers 22 and 24 and the associated bypass circuitry comprising the restrictors 30, 32 and 34, 36 and the vacuum producing, control and measuring means associated therwith.

In practice, the restrictors 30, 34, 32, 36 and 72 may be rigid diaphramgs containing a small orifice restricting flow from one side of the diaphragm to the other. Thus, the restrictors 30, 32, 34 and 36 have the effect of causing a time delay in the observation of the pressure change on one side of the restrictor from being observable on the other side. Because, in practice, that portion of the system beginning with the vacuum line 56 and which is associated with vacuum transducer 70, vacuum control means and inlet restrictor 72 and terminating at restrictor 30, 34, 32, and 36, is, in effect, a ballast in comparison with the volume of the vacuum system surrounding each of the transducers 22 and 24 and the associated eye cups 10 and 12, any small change in the pressure in the vacuum lines 26 or 28 will not be detected in the transducer chambers 132 and 142. The total volume of that portion of the system down stream of the restrictor 30, 34, 32 and 36 is approximately two orders of magnitude greater than the total pneumatic volume of the eye cups 10 and 12 and the pneumatic tubing connecting the chamber 130 with the chamber 132 of the transducer 22 and similarly the tubing surrounding the two chambers of transducer 24.

Thus, at any given pressure in the vacuum line 56, a small change in the volume or pressure of that portion of the apparatus bounded by the outer peripherery of the eye cup 10 and the restrictor 30 caused by a pulsation of the ocular globe attached to the eye cup 10 will cause the diaphragm 128 to deflect; whereas if the restrictors 30 and 34 were not present such pressure change would be almost immediately transmitted to the chamber 132 of the transducer 22 equalizing the pressure in the chambers 130 and 132, and no observable deflection of the diaphragm 128 would occur.

It is to be noted that the size of the orifices in the restrictors 30, 34, 32 and 36 is such that they are as small as possible and yet large enough to not cause a substantial difference in the pressure between the vacuum line 56 and the pressure in the transducer chambers 132 and 142. Generally the orifice size is not critical, except that the pairs of orifices 30, 34, and 32, 36 must be such that changes occurring in the opposite sides of the transducer chambers by changes in the vacuum line 56 are simultaneous in each of the transducer chambers. Further, the orifice size should be such that a pressure difference of not more than about 10 millimeters of mercury exists between the transducer chambers and the line 56. It of course is preferable that the pressure difference be as low as possible. However, the lower the pressure difference between the two aforementioned points the shorter is the time constant of the orifice and the lower the sensitivity of the actual transducer reading of the change in pressure in the line 14 due to pulsatile blood flow in the eye.

In order to measure changes in pressure between the branch or inlet 18 and the inlet 42 on opposing sides of the transducer 22, there is a excitation generator 76 associated with the transducer 22; and similarly, a excitation generator 78 associated with the transducer 24. An electrical signal is imposed upon the electrical circuitry of the transducers 22 and 24 through a pair of driver amplifiers 80 and 82. As will be explained in greater detail hereinafter, an electrical signal representative of the pressure difference at the inlet means 18 and 42 between transducer 22 and the inlet means 20 and 44 for the transducer 24 is conveyed through the lines 84 and 86 respectively to demodulators 88 and 90. From the excitation generators 76 and 78, the same excitation voltage originally imposed upon the circuitry of transducers 22 and 24 is likewise imposed upon the demodulators 88 and 90 and the resulting demodulated signals are fed respectively to the amplifiers 92 and 94. As will be explained in greater detail hereinafter, the signals imposed upon the amplifers 92 and 94 represent the pressure differences on the opposing sides of the transducers 22 and 24, and these signals after amplification in the amplifiers 92 and 94 are integrated in the integrator circuits 96 and 98. The integrated signals are again amplified respectively in amplifiers 100 and 102 and the signals are fed to conventional strip recorder channels 104 and 106 through gain control potentiometers 108 and 110 and a continuous graph recording of the pressure differences on the opposite sides of the transducers 22 and 24 are thus obtained.

While the device is in operation, the vacuum in line 56 is constantly measured and recorded on the strip recorder channel 112 by means of the signal generated from the transducer 70 which is fed through the cable 114 to signal conditioning means 116 and then through cable 118 to the strip recorder channel 112. The exact nature of the transducer 70, cable 114 and signal conditioning means 116 as well as the strip recorders channels 104, 106 and 112 have not been described in detail inasmuch as they constitute means well known in the art for measuring pressure with a transducer and obtaining a printed record on the strip recorder of such information.

Similarly, the electronic details and circuitry involved in the excitation generators 76 and 78, driver amplifiers 80 and 82, demodulators 88 and 90, amplifiers 92, 94, 100 and 102 and signal integrators 96 and 98 are well known to those skilled in the art.

Each of the electrical or electronic components of the device shown schematically in FIG. 1 are powered by appropriate power supplies which have not been illustrated but are within the skill of the art.

Interposed between the driver amplifiers 80 and 82 and the transducers 22 and 24 are transducer balance potentiometers 120 and 122 and resistors 124 and 126 which are for the purpose of adjusting the input signal to demodulators 88 and 90 so that the information obtained from the strip recorders 104 and 106 appear on the proper section of the particular chart paper employed.

The transducers 22 and 24 each contain a pair of coils and a magnetic diaphragm. Thus in the transducer 22, the magnetic diaphragm 128 isolates that portion 130 of the interior of the transducer 22 which communicates through the inlet 18 from that portion 132 sensitive to the pressure in the inlet means 42. When the pressure in the chamber 130 is equal to the pressure in the chamber 132, the inductance of the coils 134 and 136 are identical; however, minute changes in the pressure between the chambers 132 and 130 cause the diaphragm 128 to move altering the inductance in the coils 134 and 136 and creates a change in the electrical signal produced in the electrical line 138 which is tapped from the center of the coils 134 and 136.

The circuitry associated with the transducer 24 is identical to the circuitry associated with the transducer 22.

In operation, the eye cups 10 and 12 are attached to the sclerae of the patient's eyes which have been previously anesthetized. The attachment to the eye is outside of the area of the cornea of the eye and lateral to the lateral margin of the respective cornea. The vacuum pump is then activated and sufficient vacuum is created to physically force a portion of the ocular globe to deform into the eye cups. Prior to initiating operation of the device on a human patient, the vacuum adjust valve 62 is adjusted for the maximum amount of vacuum to be employed in the diagnostic test by varying the opening at the end of the tubing associated with the vacuum adjust valve 62 allowing for a constant air leakage into the system; while the vacuum relief valve insures that a maximum vacuum can be maintained by the entire system to protect the ocular globe from excessive or damaging force. The inlet restrictor 72 is constantly open to influx of ambient air and is constructed such that the entire system will decline in vacuum from the preselected maximum vacuum to ambient pressure in a predetermined time span upon deactivation of the vacuum pump 58. When the maximum vacuum has been achieved and the diagnostic test scheduled to begin, the strip recorder channels 104, 106 and 112 are activated while the vacuum pump 58 is deactivated by means of a gang switch not shown. As soon as the vacuum pump 58 is deactivated, the vacuum in the system decreases because of the air influx through the restrictor 72 and the vacuum in the system decreases and is recorded on the strip recorder channel 112. It is desirable that the initial vacuum at the beginning of the test be high enough such that the ocular globe falls under sufficient pressure that all circulation in the opthalmic artery has stopped due to the fact that a portion of the ocular globe has been forced into the eye cups thus increasing the internal fluid pressure in the ocular globe to the point where the opthalmic artery does not exert sufficient pressure to allow circulation of blood through the ocular globe. As the vacuum decreases, less and less of the ocular globe is forced into the eye cup and the fluid pressure in the ocular globe reduces to the point where arterial flow recommences in the opthalmic artery. This in turn causes a slight increase in the internal fluid pressure of the ocular globe and a consequent volume change in the system represented by the eye cup, for example 10, tubing, 26, restrictor 30, 34 and transducer chambers 130 and 132. Thus any increase of the ocular globe causes a corresponding increase in the volume of the system just described and a consequent immediate lowering of the pressure or increasing of the vacuum in the chamber 130. Because of the presence of the restrictor 30, the change in pressure in the chamber 130 is not reflected in a pressure change in chamber 132. The effect of the restrictors 30 and 34 is thus to eliminate gross changes in the vacuum in line 56 from affecting the magnitude of the electrical signal in line 84. Thus the transducer 22 measures a differential change in the pressure between the line 42 and the pressure at the point adjacent the ocular globe in the eye cup 10 and consequently allows for the detection and recordation of extremely minor changes in the volume of the ocular globe created by the presence or absence of pulsitile blood flow in the opthalmic artery.

However, the electrical impulse observable in the input 140 to the amplifier 92 is the mathematical derivation of the pressure pulsation in the ocular globe inasmuch as the transducer 22 and its associated pneumatic circuit including the restrictors 30 and 34 do not indicate the actual pressure but only the rate of change of the volume of the ocular globe.

Recorder channels 104 and 106 indicate both the presence and magnitude of blood flow in the opthalmic artery during the test while the recorder 112 simultaneously records the magnitude of the vacuum at the inlet points 38 and 40 which constantly decreases during the test. It can thus be observed directly from the recording at what pressure blood flow initiates in the opthalmic artery and the relative magnitude of that blood flow at any particular vacuum by precalibration of the graph obtained in the strip recorder channel 112 as a function of time after the initiation of the test.

Although the device has been schematically illustrated by the use of transducers 22 and 24, each of which has two coils connected in series and center tapped in association with the bypass pneumatic circuitry comprising the flow restrictors 30 and 34 and the chamber inlets 40 and 42, it must be emphasized that these means for obtaining a signal representing blood flow within the ocular globe are not unique, and it is within the contemplation of this invention that any suitable means of obtaining a representation of the pulsatile changes under investigation may be employed so long as these pulsatile changes are derived from a pneumatic system operating under constantly changing vacuum.

In order to insure the uniform function of both transducers 24 and 22, the pneumatic bypass system including the restrictors 30, 34 and 32, 36 are equipped with ganged calibrating syringes 50 and 52 communicating directly with the transducer inlets 42 and 44. In order to calibrate the device prior to its use in an actual diagnostic test, the channels 104, 106 and 112 of the recorder are activated while the entire pneumatic system is at atmospheric pressure and the cups 10 and 12 are not attached to any body portion. While the recorder is running, the ganged syringe plunger 54 is depressed causing an increase in the pressure in the systems bounded between syringes 50, 52, the flow restrictors 34, 36 and the transducer chambers 132, and 142 respectively.

As indicated in FIG. 2 by the reference numerals 207 and 209, depression of the ganged switch 54 causes a change in the signal output at 84 and 86 and a consequent recordation of the first derivative of that pressure change on the recorders. If the magnitude and shape of the strip recording of the two channels are substantially identical, the device is in calibration. If the recordings are similar in shape but differing in magnitude, the magnitude can be adjusted by varying the gain controls 108 and 110 appropriately. However, in the event that both the shape and the magnitude of the calibration recordings differ, it is an indication of a possible malfunction or foreign occlusion in either the pneumatic or electronic systems of the device.

The apparatus of this invention may be employed over a range of 0 to 700 millimeters Hg of vacuum or greater in the external sub-atmospheric pressure system. However, when employing the device in ocular pneumo-plethysmography it is desirable to use the minimum vacuum required to completely cut off circulation in the opthalmic artery of each eye. It has been found in practice that this can be done by adjusting the vacuum adjust valve 62 so that the maximum vacuum obtainable in the system is approximately 300 millimeters of mercury below atmospheric pressure.

The inlet restrictor 72 may be adjusted or designed to enable the system to decrease in vacuum (increase in pressure) from the maximum initial vacuum to ambient pressure in the time desired by the physician to conduct the individual portions of the diagnostic test. It has been determined that an adequate time span from maximum vacuum to approximately atmospheric pressure is about 20–25 seconds from the time that the vacuum pump 58 is deactivated after the pneumatic system has reached maximum vacuum. The capacity of the pump 58 must be sufficiently high so that it will maintain the desired vacuum considering the adjustment valve 62 and the inlet restrictor 72. That is to say, there is a constant influx of air into the system through the inlet restrictor 72 and the vacuum adjustment valve 62 while the vacuum pump is in operation.

Referring specifically to FIGS. 2, 3 and 4, there is illustrated the results of a diagnosis of the blood flow of the internal carotid arteries of a patient as measured through pulsative changes in the opthalmic arteries. The upper portion 201 of the tracing in FIG. 2 represent the recordation of the data supplies in response to pulsatile volume changes in the eye through the transducer 22 while the lower portion 203 represents the data obtained from the transducer 24. The central portion of the tracing 205 is a recordation of the data generated by the pressure transducer 70 through its associated signal conditioning means 116. That is, the tracing 201 is the output of the strip recorder channel 104 while the tracing 203 is the output of the strip recorder channel 106 and the tracing 205 is the output of the strip recorder channel 112. As previously indicated, the initial portion 207 of the recording 201 represents calibration of the device at ambient pressure in response to depressing the ganged plunger 54 of the calibrating syringes 50 and 52; similarly the calibration for the other channel of the device is represented by the reference numeral 209.

As is illustrated at 211, the entire pneumatic system of the device was at atmospheric pressure when the calibration was taken. After the calibration and attachment of the eye cups 10 and 12, the vacuum pump 58 was activated and the vacuum exposed to the transducer 70 increased as illustrated by that portion of the recording 205 indicated at 213. The depressions 215 and 217 indicate the point where maximum vacuum of the system had been obtained and the vacuum pump 58 deactivated. As illustrated by the relatively straight portions of the graph 201 and 203, at 219 and 221, at the maximum vacuum and while the vacuum proceeded to decrease, the volume of each ocular globe did not vary in response to pulsatile changes indicating complete blockage of the blood flow in the opthalmic artery due to the increase in the intraocular pressure created by the vacuum in the eye cups 10 and 12.

As indicated by the point 223, as the vacuum decreased pulsatile changes became perceivable in the recording 201 at a time prior to that at which they occur at the point 225 in the recording 203. This is an indication that the systolic pressure in the opthalmic artery of the ocular globe attached to the eye cup 10 was higher than that of the ocular globe attached to the eye cup 12. It is also observable that the magnitude of the peaks 227 in the tracing 201 are higher than those at 229 in the tracing 203 indicating a larger volume of pulsation in the ocular globe attached to the eye cup 10. Thus, FIG. 2 is an indication that the patient under diagnosis has a stenosis of the carotid artery associated with the opthalmic artery leading to the ocular glove attached to the eye cup 12.

In continuing the diagnosis of the patient after completion of the procedure described above and illustrated in FIG. 2, the vacuum pump 58 was reactivated with eye cups 10 and 12 still attached to the patient and the maximum vacuum achieved on the recorder. When the maximum vacuum had been achieved and the vacuum pump deactivated and recording initiated, the examining physicain compressed the common carotid artery associated with the ocular glove attached to the eye cup 10.

FIG. 3 illustrates the graphical recording obtained in this procedure. The tracings identified by reference numerals 301, 303 and 305 are continuations of the tracings obtained in FIG. 2 designated 201, 203 and 205.

It can be seen from FIG. 3 that while the internal carotid artery associated with the eye cup 10 (i.e., the tracing 301) is depressed, there is an almost total lack of blood flow through the opthalmic artery of the other side indicating a stenosis of the internal carotid artery of the other side of the head (i.e., the carotid artery associated with the ocular globe attached to the eye cup 12– the tracing 303). This is made obvious by the fact that systolic blood pressure pulse in the tracing 303 occurs at a much lower vacuum and later point in time than that indicated in the tracing 203 of FIG. 2.

In FIG. 4 the test was again repeated as with the test illustrated in FIG. 3 except that the opposite carotid artery (the tracing 403) was compressed. As in FIGS. 2 and 3, the degree of vacuum in the total pneumatic system is indicated by the tracing associated with the reference numeral 405. It can be observed that blood flow initiated in the tracing 401 much earlier than in the tracing 403 which was to be expected from the indication obtained in the procedure illustrated by FIG. 3 that there was a stenosis of one of the carotid arteries. Thus, when the artery containing the stenosis was depressed, it would not affect the blood flow on the opposite side as illustrated by the tracing 401. The fact that blood flow did initiate in the tracing 403 at a later time is an indication of some collateral circulation between the two carotid arteries. It should also be pointed out with respect to FIG. 3 that the indication of blood flow in the tracing 303 was not due to collateral circulation from the other internal carotid artery but rather was an indication of the collateral blood flow from other sources.

We claim:

1. An apparatus for determining blood pressure pulse waves at constantly changing levels of external vacuum as an indication of blood flow to a particular part of a human body comprising:
   a. vacuum transmitting means attachable to a body portion to deform said portion in response to changing sub-atmospheric pressure in a system external to the body portion;
   b. detecting means for detecting pressure changes in said system in response to changes in the volume of the body portion;
   c. vacuum control means for continuously varying the sub-atmospheric pressure in said external system over a predetermined pressure range;
   d. said detecting means comprising a first chamber separated by a diaphragm from a second chamber, each of said chambers being operatively connected to said vacuum control means through a flow restrictor;
   e. said vacuum transmitting means being operatively connected to one of said chambers independent of said flow restrictor and operatively connected to said vacuum control means through said flow restrictor;
   f. and recording means for continuously recording pressure changes caused by said volume changes.

2. The apparatus of claim 1 wherein said vacuum transmitting means is attachable to the sclera of the eye by means of an eye cup.

3. The apparatus of claim 1 additionally comprising second recording means for measuring and recording said continuously varying sub-atmospheric pressure.

4. The apparatus of claim 1 wherein said detecting means is a transducer.

5. An apparatus for simultaneously determining and comparing a pair of blood pressure pulse waves in the two ocular globes of a human being at constantly changing levels of external vacuum as an indication of blood flow through the internal carotid arteries and of collateral circulation between the body portions served by the internal carotid arteries comprising;
   a. a pair of vacuum transmitting means attachable to the ocular globes to deform said globes in response to changing sub-atmospheric pressure in a system external to said globes;
   b. a pair of detecting means for detecting pressure changes in said system in response to changes in the volumes of said ocular globes individually;
   c. vacuum control means for continuously varying the sub-atmospheric pressure in the external system over a predetermined pressure range;
   d. a pair of recording means associated individually with each of said detecting means for continuously recording the pressure changes in said system by the volume changes in each ocular globe as a differential above or below said continuously varying sub-atmospheric pressure; and
   e. means for measuring and recording said continuously varying sub-atmospheric pressure.

6. An apparatus for simultaneously determining and comparing a pair of blood pressure pulse waves in the two ocular globes of a human being at constantly changing levels of external vacuum as an indication of blood flow through the ophthalmic arteries via the internal carotid arteries and of collateral circulation between the body portions served by the internal carotid arteries comprising;
   a. a pair of vacuum transmitting means attachable to the ocular globes to deform said globes in response to changing sub-atmospheric pressure in a system external to said globes;
   b. a pair of detecting means for detecting pressure changes in said system in response to changes in the volumes of said ocular globes individually;
   c. vacuum control means for continuously varying the sub-atmospheric pressure in the external system over a predetermined pressure range;
   d. each of said detecting means comprising a first chamber separated by a diaphragm from a second chamber, each of said chambers being operatively connected to said vacuum control means through a flow restrictor;
   e. each of said vacuum transmitting means being operatively connected to one of said chambers independent of said flow restrictor, and operatively connected to said vacuum control means through said flow restrictor;
   f. a pair of recording means associated individually with each of said detecting means for continuously recording the pressure changes in said system by the volume changes in each ocular globe as a differential above or below said continuously varying sub-atmospheric pressure; and
   g. means for measuring and recording said continuously varying sub-atmospheric pressure.

7. A process for simultaneously determining and comparing a pair of blood pressure pulse waves in the two ocular globes of a human being at constantly changing levels of external vacuum as an indication of the blood flow through the internal carotid arteries and of collateral circulation between the body portions served by the internal carotid arteries which comprises,
   a. deforming both ocular globes simultaneously by the application of vacuum thereto to the point where blood flow in the ocular globes is terminated;
   b. allowing said vacuum to diminish toward ambient pressure;
   c. recording simultaneously the extent of vacuum application and the blood flow pulses generated in each ocular globe as the pressure increases to ambient by measuring the pressure adjacent the ocular globe as a differential above and below the applied vacuum, and
   d. repeating said process while compressing manually one of the common carotid arteries.

8. An apparatus for determining blood pressure pulse waves at constantly changing levels of external vacuum as an indication of blood flow to a particular part of a human body comprising:
   a. vacuum transmitting means attachable to a body portion to deform said portion in response to changing sub-atmospheric pressure in a system external to the body portion;
   b. transducer means for detecting pressure changes in said system in response to changes in the volume of the body portion;
   c. vacuum control means for continuously varying the sub-atmospheric pressure in said external system over a predetermined pressure range;
   d. said detecting means comprising a transducer operatively connected to said vacuum control means through a flow restrictor;
   e. said vacuum transmitting means being operatively connected to said transducer independent of said flow restrictor and operatively connected to said vacuum control means through ssaid flow restrictor; and
   f. recording means for continuously recording pressure changes caused by said volume changes.

* * * * *